United States Patent
Shimada et al.

(10) Patent No.: US 12,400,423 B2
(45) Date of Patent: Aug. 26, 2025

(54) IMAGING APPARATUS

(71) Applicant: FUJIFILM Corporation, Tokyo (JP)

(72) Inventors: Tomoharu Shimada, Saitama (JP); Takehiro Koguchi, Saitama (JP); Taro Saito, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 458 days.

(21) Appl. No.: 17/943,217

(22) Filed: Sep. 13, 2022

(65) Prior Publication Data

US 2023/0005241 A1 Jan. 5, 2023

Related U.S. Application Data

(63) Continuation of application No. PCT/JP2021/012511, filed on Mar. 25, 2021.

(30) Foreign Application Priority Data

Mar. 27, 2020 (JP) ................. 2020-057928

(51) Int. Cl.
*H04N 23/73* (2023.01)
*G03B 7/097* (2021.01)
(Continued)

(52) U.S. Cl.
CPC ............. *G06V 10/60* (2022.01); *G03B 7/097* (2013.01); *G06V 10/141* (2022.01); *H04N 23/72* (2023.01);
(Continued)

(58) Field of Classification Search
CPC ...... G06V 10/60; G06V 10/141; G03B 7/097; G03B 2205/0046; G03B 7/095;
(Continued)

(56) References Cited

U.S. PATENT DOCUMENTS 9,313,375 B1 *  4/2016  Chakravarty ........ H04N 23/633
2014/0178061 A1  6/2014  Saita
(Continued)

FOREIGN PATENT DOCUMENTS

JP  H01159470   11/1989
JP  2007189295   7/2007
(Continued)

OTHER PUBLICATIONS

"International Search Report (Form PCT/ISA/210) of PCT/JP2021/012511," mailed on Jun. 1, 2021, with English translation thereof, pp. 1-5.
(Continued)

*Primary Examiner* — Mekonnen D Dagnew
(74) *Attorney, Agent, or Firm* — JCIPRNET

(57) ABSTRACT

Provided is an imaging apparatus capable of continuously imaging a natural video even though brightness is changed. In an imaging apparatus in which an exposure condition is set based on a characteristic of a transmittance control element, a first exposure condition range is calculated based on photometry of the imaging apparatus. Determination is made whether or not the calculated first exposure condition range is included in a second exposure condition range where a control range acquired by the transmittance control element is applicable. In a case where the calculated first exposure condition range is not included in the second exposure condition range, the exposure condition of the imaging apparatus is changed such that the first exposure condition range is included in the second exposure condition range.

14 Claims, 10 Drawing Sheets

(51) Int. Cl.
*G06V 10/141* (2022.01)
*G06V 10/60* (2022.01)
*H04N 23/72* (2023.01)
*H04N 23/75* (2023.01)
*H04N 23/76* (2023.01)
*H04N 23/959* (2023.01)

(52) U.S. Cl.
CPC ............ *H04N 23/73* (2023.01); *H04N 23/75* (2023.01); *H04N 23/76* (2023.01); *H04N 23/959* (2023.01); *G06T 2207/10144* (2013.01)

(58) Field of Classification Search
CPC .......... G03B 7/18; G03B 13/34; G03B 7/091; H04N 23/72; H04N 23/73; H04N 23/75; H04N 23/76; H04N 23/959; H04N 23/70; G06T 2207/10144
See application file for complete search history.

(56) References Cited

U.S. PATENT DOCUMENTS

| | | | |
|---|---|---|---|
| 2016/0373635 A1* | 12/2016 | Ikeda | ...................... H04N 23/82 |
| 2019/0230270 A1 | 7/2019 | Uchida et al. | |
| 2020/0045217 A1 | 2/2020 | Kondo | |
| 2020/0065950 A1* | 2/2020 | Wang | ...................... H04N 23/743 |

FOREIGN PATENT DOCUMENTS

| | | |
|---|---|---|
| JP | 2017062466 | 3/2017 |
| JP | 2017191310 | 10/2017 |
| JP | 2019128380 | 8/2019 |
| JP | 2020022034 | 2/2020 |
| WO | 2013031429 | 3/2013 |

OTHER PUBLICATIONS

"Written Opinion of The International Searching Authority (Form PCT/ISA/237)" of PCT/JP2021/012511, mailed on Jun. 1, 2021, with English translation thereof, pp. 1-6.

* cited by examiner

FIG. 3

|  |  |  |  |  |  |  | 20 |
|---|---|---|---|---|---|---|---|
| a18 | a28 | a38 | a48 | a58 | a68 | a78 | a88 |
| a17 | a27 | a37 | a47 | a57 | a67 | a77 | a87 |
| a16 | a26 | a36 | a46 | a56 | a66 | a76 | a86 |
| a15 | a25 | a35 | a45 | a55 | a65 | a75 | a85 |
| a14 | a24 | a34 | a44 | a54 | a64 | a74 | a84 |
| a13 | a23 | a33 | a43 | a53 | a63 | a73 | a83 |
| a12 | a22 | a32 | a42 | a52 | a62 | a72 | a82 |
| a11 | a21 | a31 | a41 | a51 | a61 | a71 | a81 |

(20A indicates the second row from top: a17–a87)

FIG. 12

| EXPOSURE AMOUNT (EV VALUE) | MARGIN ||
|---|---|---|
| | α (− SIDE) | β (+ SIDE) |
| 16 | 2 | 0 |
| 15 | 2 | 1 |
| 14 | | |
| 13 | | |
| 12 | 3 | 2 |
| 11 | | |
| 10 | | |
| 9 | 3 | 3 |
| 8 | | |
| 7 | | |
| 6 | 4 | 4 |
| 5 | 3 | 3 |
| 4 | | |
| 3 | | |
| 2 | 2 | 3 |
| 1 | | |
| 0 | | |
| −1 | 1 | 2 |
| −2 | | |
| −3 | | |
| −4 | 0 | 2 |

FIG. 13

| EXPOSURE AMOUNT (EV VALUE) | SCENE |
|---|---|
| 16 | CLEAR BEACH, SNOWSCAPE |
| 15 | |
| 14 | FINE WEATHER |
| 13 | |
| 12 | CLOUDY, SHADE |
| 11 | |
| 10 | RAINY WEATHER, STUDIO, NIGHT GAME |
| 9 | |
| 8 | BRIGHT INDOOR SPACE, DUSK, GYMNASIUM |
| 7 | |
| 6 | INDOOR SPACE, OFFICE |
| 5 | |
| 4 | BRIGHT NIGHT VIEW, DARK INDOOR SPACE, FIREWORKS |
| 3 | |
| 2 | REMOTE NIGHT VIEW, MOVIE THEATER |
| 1 | |
| 0 | THIN LIGHT, RESIDENTIAL AREA AT NIGHT |
| −1 | |
| −2 | MOONLIGHT NIGHT |
| −3 | |
| −4 | STARRY SKY |

IMAGING APPARATUS

CROSS-REFERENCE TO RELATED APPLICATIONS

The present application is a Continuation of PCT International Application No. PCT/JP2021/012511 filed on Mar. 25, 2021 claiming priority under 35 U.S.C § 119(a) to Japanese Patent Application No. 2020-057928 filed on Mar. 27, 2020. Each of the above applications is hereby expressly incorporated by reference, in its entirety, into the present application.

BACKGROUND OF THE INVENTION

1. Field of the Invention

The present invention relates to an imaging apparatus, and in particular, to an imaging apparatus that images a video.

2. Description of the Related Art

A technique that controls exposure using a transmittance control element, such as a variable neutral density filter (variable ND filter) is known (JP2017-191310A, JP2017-62466A, WO2013/031429A, and the like).

SUMMARY OF THE INVENTION

An embodiment according to the technique of the present disclosure provides an imaging apparatus capable of continuously imaging a natural video even though brightness is changed.

(1) An imaging apparatus in which an exposure condition is set based on a characteristic of a transmittance control element, the imaging apparatus comprising a processor, in which the processor is configured to calculate a first exposure condition range based on photometry of the imaging apparatus, and in a case where the first exposure condition range is not included in a second exposure condition range where a control range acquired by the transmittance control element is applicable, change the exposure condition of the imaging apparatus such that the calculated first exposure condition range is included in the second exposure condition range.

(2) The imaging apparatus according to (1), in which the processor is configured to decide imaging scene information based on the photometry of the imaging apparatus and calculate the first exposure condition range based on the decided imaging scene information.

(3) The imaging apparatus according to (1) or (2), in which the processor is configured to control exposure with the transmittance control element in the second exposure condition range during imaging.

(4) The imaging apparatus according to (3), in which the processor is configured to, in a case where a third exposure condition range calculated based on the photometry of the imaging apparatus is different from the first exposure condition range during imaging, change the exposure condition of the imaging apparatus such that the third exposure condition range is included in the second exposure condition range.

(5) The imaging apparatus according to any one of (1) to (4), in which the exposure condition is an aperture stop control amount, a shutter speed control amount, and a sensitivity control amount.

(6) The imaging apparatus according to (5), in which the processor is configured to determine an exposure control mode, and fix the aperture stop control amount to set the exposure condition in a case where the exposure control mode is an aperture priority mode.

(7) The imaging apparatus according to (5), in which the processor is configured to determine an exposure control mode, and fix the shutter speed control amount to set the exposure condition in a case where the exposure control mode is a shutter speed priority mode.

(8) The imaging apparatus according to (5), in which the processor is configured to determine an exposure control mode, and fix the aperture stop control amount and the shutter speed control amount to set the exposure condition in a case where the exposure control mode is a manual mode.

(9) The imaging apparatus according to (5), in which the processor is configured to determine an exposure control mode, and set the transmittance control element to a median value of a movable range in a case where the exposure control mode is an auto mode.

(10) The imaging apparatus according to (9), in which the processor is configured to change the aperture stop control amount, the shutter speed control amount, and the sensitivity control amount with priority determined in advance in a case where the transmittance control element is out of a settable range during imaging.

(11) The imaging apparatus according to (10), in which the priority is an order of the shutter speed control amount in a range from a maximum value to ½ of the maximum value, the sensitivity control amount, the shutter speed control amount of ½ of a maximum value, and the aperture stop control amount.

(12) The imaging apparatus according to any one of (1) to (11), in which the processor is configured to measure a fluctuation width of an exposure amount in a case where a video is imaged, record information regarding the measured fluctuation width of the exposure amount in a memory, and sets the first exposure condition range based on information regarding a history of the fluctuation width of the exposure amount recorded in the memory.

(13) The imaging apparatus according to any one of (1) to (11), in which the processor is configured to acquire information regarding a fluctuation width of an exposure amount that is supposed in a case where a video is imaged, in advance, and set the first exposure condition range based on the acquired information regarding the fluctuation width of the exposure amount.

(14) The imaging apparatus according to any one of claims (1) to (11), in which the processor is acquire information regarding a fluctuation width of an exposure amount of a region where a video is imaged, in advance, and set the first exposure condition range based on the acquired information regarding the fluctuation width of the exposure amount.

BRIEF DESCRIPTION OF THE DRAWINGS

FIG. 3 is a diagram showing an example of region division.

FIG. 12 is a diagram showing an example of a margin that is added to an estimated exposure change amount.

FIG. 13 is a diagram showing a relationship between an exposure amount and a scene.

DESCRIPTION OF THE PREFERRED EMBODIMENTS

Hereinafter, a preferred embodiment of the present disclosure will be described in detail referring to the accompanying drawings.

First Embodiment

In imaging of a video, it is not desirable that a depth of field, a moving body feeling, a granular feeling, and the like are changed during imaging, except for a case where a special expression is aimed, or the like. In general, the depth of field changes depending on an F number, the moving body feeling changes depending on a shutter speed, and the granular feeling changes depending on imaging sensitivity. With the use of a transmittance control element, such as a variable ND filter, it is possible to control exposure without changing the F number, the shutter speed, and the imaging sensitivity during imaging. With this, it is possible to continuously image a natural video even though brightness is changed.

Note that a movable range of the transmittance control element is limited. For this reason, in starting imaging of a video, in a case where the transmittance control element is set close to an upper limit value or a lower limit value of the movable range, exposure may not be controlled only with the transmittance control element during imaging. On the other hand, in a case where the transmittance control element is forcibly set to a median value of the movable range, a video cannot be imaged under exposure conditions (F number, shutter speed, and imaging sensitivity) desired by a user.

In the present embodiment, there is provided an imaging apparatus capable of continuously imaging a natural video even though brightness is changed, while maintaining the exposure conditions set by the user as much as possible.

[Apparatus Configuration]

Figure 1:
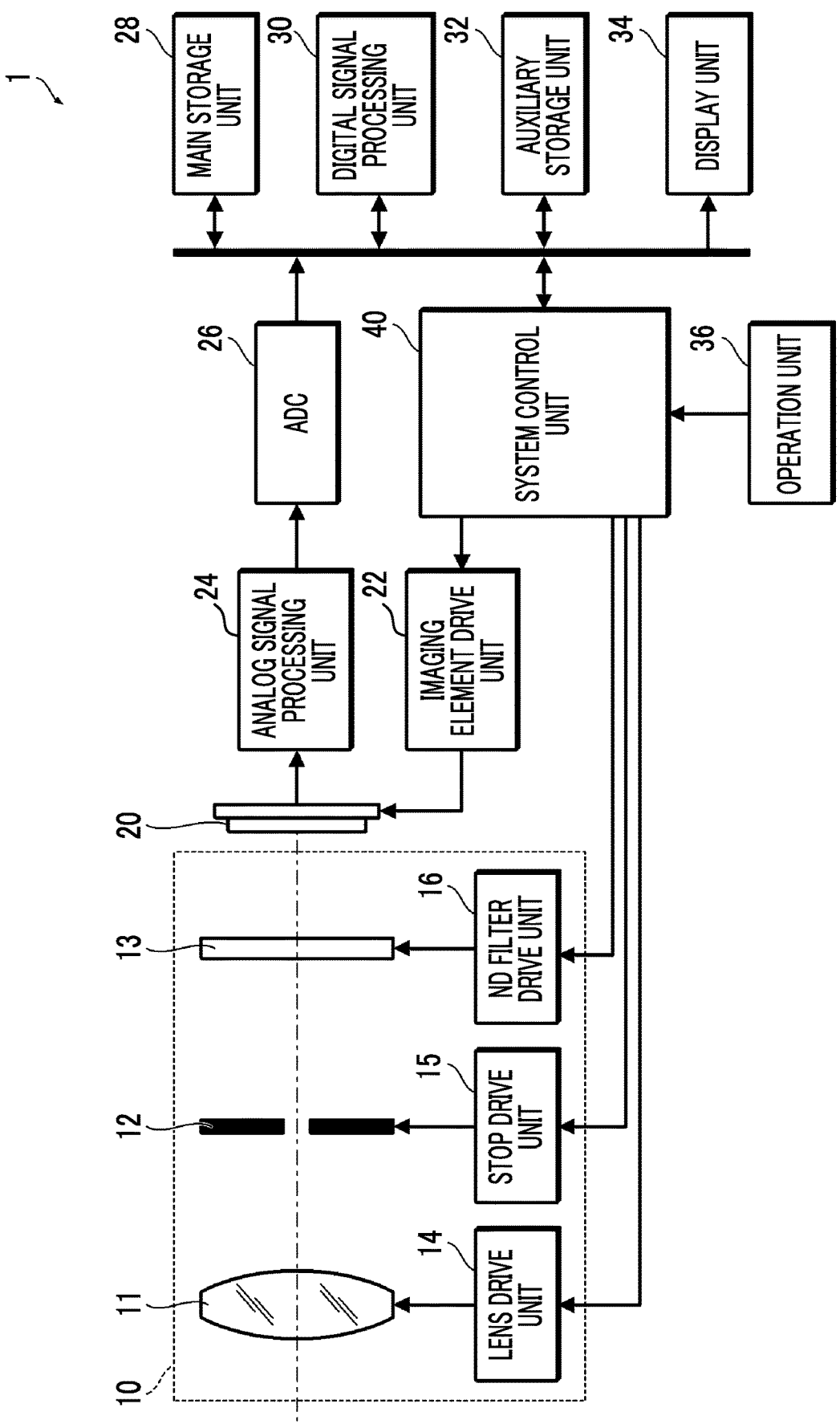
FIG. 1 is a diagram showing the schematic configuration of an imaging apparatus.

FIG. 1 is a diagram showing the schematic configuration of the imaging apparatus.

As shown in FIG. 1, an imaging apparatus 1 of the present embodiment primarily comprises an imaging lens 10, an imaging element 20, an imaging element drive unit 22, an analog signal processing unit 24, an analog to digital converter (ADC) 26, a main storage unit 28, a digital signal processing unit 30, an auxiliary storage unit 32, a display unit 34, an operation unit 36, a system control unit 40, and the like.

The imaging lens 10 primarily comprises a lens 11, a stop 12, a variable ND filter 13, a lens drive unit 14, a stop drive unit 15, an ND filter drive unit 16, and the like. In FIG. 1, for convenience, although only one lens 11 is shown, the imaging lens 10 comprises a plurality of lenses.

The imaging lens 10 is configured with, for example, a zoom lens. The imaging lens 10 zooms by moving a zoom lens group in a front-rear direction along an optical axis. The imaging lens 10 has a focus adjustment mechanism, and moves a focus lens group in the front-rear direction along the optical axis, such that a focus is adjusted. The lens drive unit 14 moves the zoom lens group and the focus lens group in the front-rear direction along the optical axis.

The stop 12 is configured with, for example, an iris stop. The stop 12 is disposed in an optical path of the imaging lens 10 to adjust the light amount passing through the imaging lens 10. The stop 12 is driven by the stop drive unit 15, such that an aperture amount is changed.

The variable ND filter 13 is disposed in the optical path of the imaging lens 10 to evenly decrease the light amount passing through the imaging lens 10. The variable ND filter 13 is an ND filter that has a variable decreasing rate of the light amount. In the imaging apparatus 1 of the present embodiment, an electronic variable ND filter 13 is used. The electronic variable ND filter changes in the decreasing rate of the light amount depending on a voltage applied thereto. In the imaging apparatus 1 of the present embodiment, as an example, the variable ND filter 13 that changes in the decreasing rate of the light amount within a range from ¼ to ¹⁄₁₂₈ is used. The variable ND filter 13 is an example of a transmittance control element. The variable ND filter 13 is driven by the ND filter drive unit 16, such that the decreasing rate of the light amount changes.

The imaging element 20 is configured to a color area image sensor. The image sensor is configured with, for example, a complementary metal-oxide semiconductor (CMOS) type or a charged coupled device (CCD) type image sensor having a predetermined color filter array (for example, a Bayer array). The imaging element 20 is driven by the imaging element drive unit 22 and operates. The imaging apparatus 1 electronically controls the on and off of the imaging element 20, such that an exposure time (shutter speed) is adjusted (so-called, an electronic shutter function).

The analog signal processing unit 24 executes predetermined signal processing on an analog image signal output from the imaging element 20. The analog signal processing unit 24 includes a sampling/hold circuit, a color separation circuit, an automatic gain control circuit (AGC circuit), and the like. The AGC circuit functions as a sensitivity adjustment unit that adjusts imaging sensitivity (International Organization for Standardization (ISO) sensitivity).

The ADC 26 converts the analog image signal subjected to the predetermined signal processing in the analog signal processing unit 24 into a digital image signal.

In a case where the imaging element 20 is configured with a CMOS type image sensor, the imaging element drive unit 22, the analog signal processing unit 24, and the ADC 26 are often included in the imaging element 20. In a case where the imaging element 20 is configured with a CMOS type image sensor, a digital image sensor signal processing unit is often provided instead of the analog signal processing unit 24.

In a case where the imaging element 20 is configured with a CMOS type image sensor including an ADC and a digital image sensor signal processing unit, a signal of each pixel is output from the imaging element 20 as described below. The signal of each pixel is amplified in an analog amplification unit provided for each pixel or for every plural pixels, is read out in units of rows, and is supplied to the ADC. The ADC converts the supplied signal of each pixel into a digital signal and supplies the digital signal to the image sensor signal processing unit. The image sensor signal processing unit executes various kinds of signal processing, such as digital correlative double sampling processing, digital gain processing, and correction processing, on the supplied digital signal of each pixel. The signal subjected to various kinds of signal processing in the signal processing unit is output from the imaging element 20.

The main storage unit 28 is used as a temporary storage area of data. The image signal output from the imaging element 20 is stored for each frame in the main storage unit 28 through the analog signal processing unit 24 and the ADC 26.

The digital signal processing unit 30 executes signal processing, such as offset processing, gamma correction processing, demosaic processing, and RGB/YCrCb conversion processing, on the image signal converted into the digital signal to generate image data. The digital signal processing unit 30 is configured with, for example, a microprocessor.

The auxiliary storage unit 32 primarily stores image data obtained by imaging. The auxiliary storage unit 32 is configured with an internal memory and/or an external memory. The internal memory is a memory that is embedded in a body of the imaging apparatus 1. The internal memory is configured with, for example, a nonvolatile semiconductor memory. The external memory is configured with, for example, a memory card, and is loaded in a card slot provided in an imaging apparatus body.

The display unit 34 is used to reproduce a captured image, and also displays a live view image in imaging. The display unit 34 is used as a setting screen in performing various settings. The display unit 34 is configured with, for example, a display, such as a liquid crystal display (LCD) or an organic light emitting diode (OLED).

The operation unit 36 includes various operation members that are provided for operating the imaging apparatus 1. The operation members include an operation member (power button) that turns on or off a power supply of the imaging apparatus 1, an operation member (record button) that instructs start and end of imaging, operation members that perform various settings, and the like. The operation members that perform various settings include, for example, an operation member that sets an exposure control mode, an operation member that sets an F number, an operation member that sets a shutter speed, and an operation member that sets imaging sensitivity. The operation member that sets the exposure control mode is configured with, for example, a mode dial. The exposure control mode includes, for example, an auto mode, an aperture priority mode, a shutter speed priority mode, and a manual mode. The auto mode is a mode where the F number, the shutter speed, and the imaging sensitivity are automatically set. The aperture priority mode is a mode where the shutter speed and the imaging sensitivity are automatically set conforming to the set F number. The shutter speed priority mode is a mode where the F number and the imaging sensitivity are automatically set conforming to the shutter speed. The manual mode is a mode where the F number and the shutter speed are manually set. The operation member that sets the F number is configured with, for example, a stop ring. The operation member that sets the shutter speed is configured with, for example, a shutter speed dial. The operation member that sets the imaging sensitivity is configured with, for example, an imaging sensitivity dial. The settings may be set on the screen using the display unit 34 and an operation member, such as a cross key. The operation unit 36 outputs a signal depending on the operation of each operation member to the system control unit 40.

The system control unit 40 controls the operation of each unit of the imaging apparatus 1 to integrally control the operation of the entire imaging apparatus 1. The system control unit 40 executes calculation processing of physical quantities necessary for control, and the like. The system control unit 40 is configured with, for example, a microcomputer comprising a processor and a memory. The processor is configured with, for example, a central processing unit (CPU). The memory is configured with, for example, a random access memory (RAM) and a read only memory (ROM). In the memory, a program that is executed by the processor and various kinds of data are stored.

The control that is performed by the system control unit 40 includes exposure control. In the imaging apparatus 1 of the present embodiment, exposure is controlled by the stop 12, the shutter speed, the imaging sensitivity, and the variable ND filter 13. Hereinafter, exposure control that is performed in a case of imaging a video with the imaging apparatus 1 of the embodiment will be described.

Figure 2:
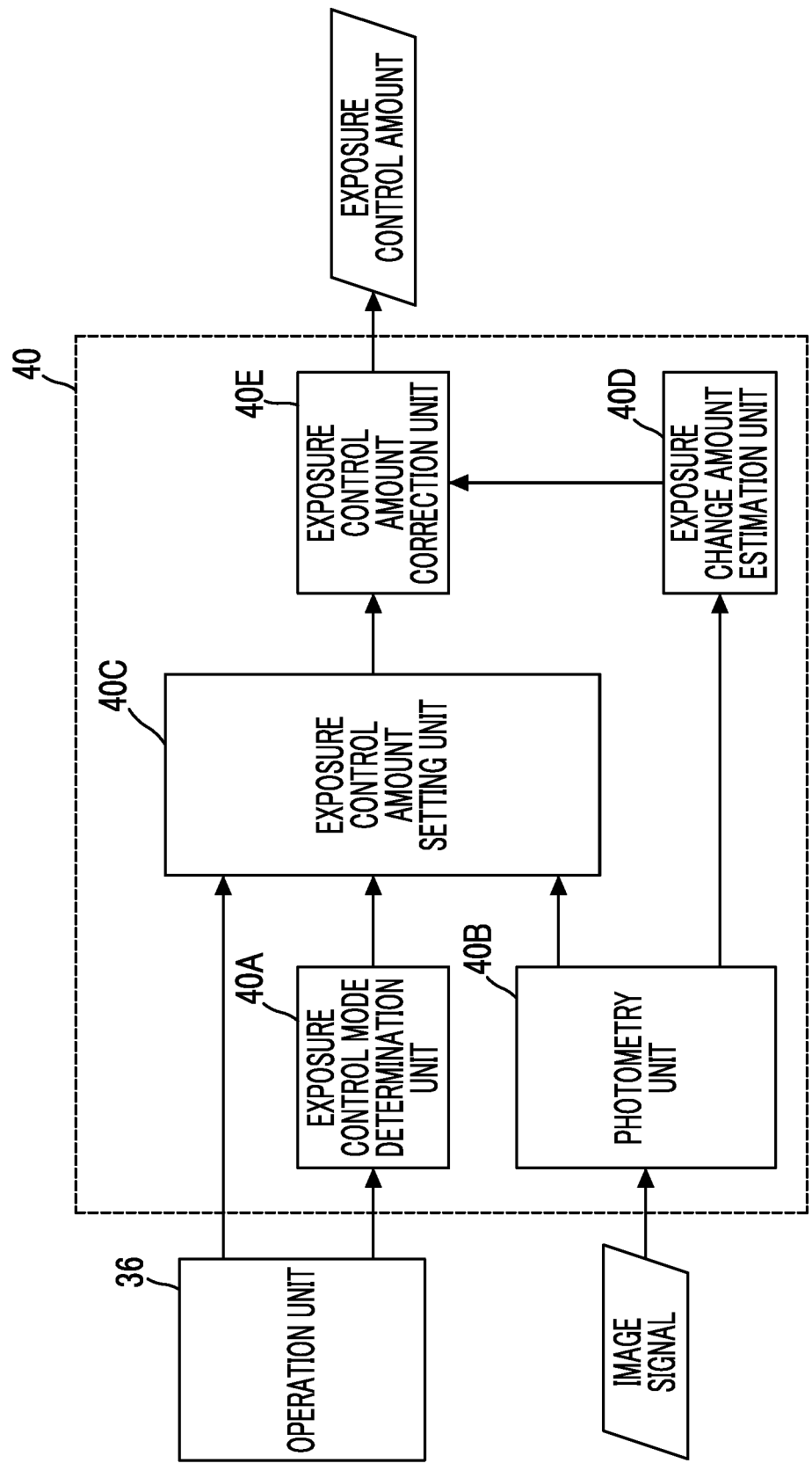
FIG. 2 is a block diagram of a function concerning exposure control.

FIG. 2 is a block diagram of functions concerning the exposure control.

As shown in FIG. 2, the system control unit 40 functions as an exposure control mode determination unit 40A, a photometry unit 40B, an exposure control amount setting unit 40C, an exposure change amount estimation unit 40D, and an exposure control amount correction unit 40E in terms of the exposure control.

The exposure control mode determination unit 40A determines the set exposure control mode. The exposure control mode determination unit 40A determines the exposure control mode based on information from the operation unit 36. Specifically, the exposure control mode determination unit 40A determines the currently set exposure control mode (the auto mode, the aperture priority mode, the shutter speed priority mode, the manual mode, or the like) based on the setting of the mode dial.

The photometry unit 40B measures brightness of a subject based on an image signal output from the imaging element 20. The photometry unit 40B measures the brightness of the subject to calculate an exposure amount. The exposure amount is calculated as, for example, an exposure value (EV value). In the imaging apparatus 1 of the embodiment, a light-receiving surface of the imaging element 20 is divided into a plurality of regions, and photometry is performed to calculate the exposure amount for each region. FIG. 3 is a diagram showing an example of region division. As shown in FIG. 3, in the imaging apparatus of the present embodiment, a light-receiving surface 20A of the imaging element 20 is equally divided into 8×8 regions a11 to a88.

The exposure control amount setting unit 40C sets an exposure control amount. That is, the exposure control amount setting unit 40C sets the F number, the shutter speed, the imaging sensitivity, and the decreasing rate of the light amount. In particular, the F number, the shutter speed, and the imaging sensitivity are set as exposure conditions. The F number is an example of an aperture stop control amount. The shutter speed is an example of a shutter speed control amount. The imaging sensitivity is an example of a sensitivity control amount. The exposure control amount setting unit 40C sets the exposure control amounts with which desired brightness is obtained, based on a photometry result of the photometry unit 40B. For example, a photometry result of each region is weighted, the total exposure amount is obtained, and the exposure control amounts with which the desired brightness is obtained are set based on the obtained total exposure amount. The desired brightness is, for example, brightness with which appropriate exposure is performed. Normally, each exposure control amount is set such that appropriate exposure is performed. For example, in a case where exposure correction or the like is performed, each exposure control amount is set such that corrected exposure is performed.

The exposure control amount setting unit 40C sets each exposure control amount following the currently set exposure control mode in setting the exposure control amounts. In a case of the auto mode, the variable ND filter 13 is set to the median value of the movable range, and each exposure control amount is set. In a case of the aperture priority mode, the F number is fixed, and each exposure control amount is set. In a case of the shutter speed priority mode, the shutter speed is fixed, and each exposure control amount is set. In a case of the manual mode, the F number and the shutter speed are fixed, and each exposure control amount is set. In each mode, the exposure control amounts are set depending on reference determined in advance such that the desired brightness is obtained. For example, the exposure control amounts are set following a program diagram or the like.

The exposure change amount estimation unit 40D estimates an exposure change amount of a scene to be imaged. The exposure change amount estimation unit 40D estimates the exposure change amount based on the photometry result (the exposure amount of each of the regions a11 to a88) of the photometry unit 40B. In the present embodiment, the exposure change amount is estimated as follows. First, information regarding the exposure amount of each of the regions a11 to a88 is acquired. Next, a darkest region and a brightest region are specified based on the acquired information regarding the exposure amount of each of the regions a11 to a88. Next, a range of an exposure amount that covers from the specified darkest region to the brightest region is obtained. The obtained range is defined as an estimated exposure change amount. In this case, for example, in a case where the exposure amount of the darkest region is 10 EV and the exposure amount of the brightest region is 15 EV, a range of 10 EV to 15 EV is calculated as the estimated exposure change amount.

The exposure control amount correction unit 40E corrects each exposure control amount set in the exposure control amount setting unit 40C as needed. The exposure control amount correction unit 40E determines a need for correction based on a characteristic of the variable ND filter 13, a set value of the variable ND filter 13, the exposure change amount (estimated exposure change amount) estimated in the exposure change amount estimation unit 40D, and the exposure amount in a case where the exposure control amount is set. Here, the characteristic of the variable ND filter 13 is specifically a control range of the variable ND filter 13. The control range of the variable ND filter 13 is specified as the movable range of the variable ND filter 13. The movable range of the variable ND filter 13 is a so-called movable width, and is a changeable range of the decreasing rate of the light amount. In a case of the variable ND filter 13 of the present embodiment, a range of ¼ to ¹⁄₁₂₈ is a movable range.

Figure 4:
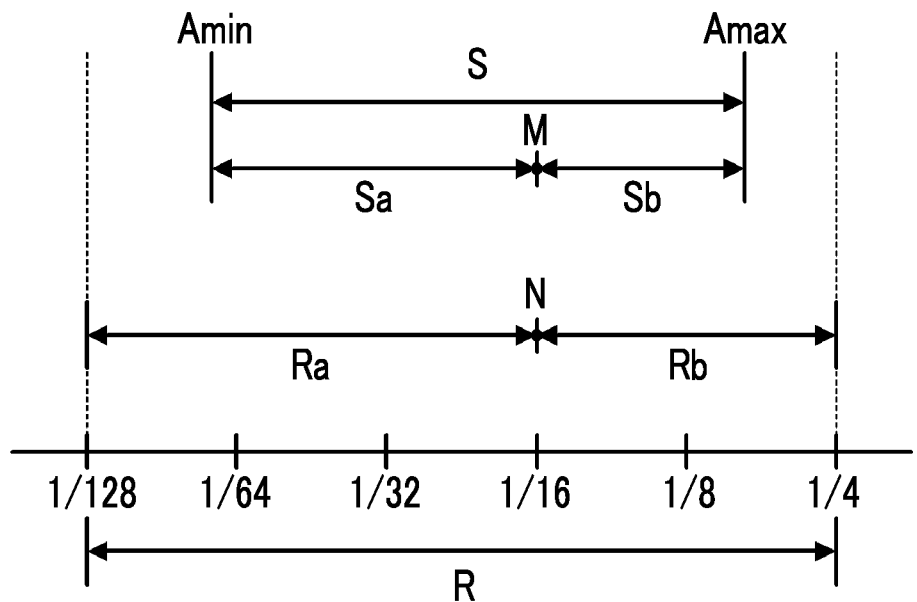
FIG. 4 is a conceptual diagram of determination of a need for correction.
Figure 5:
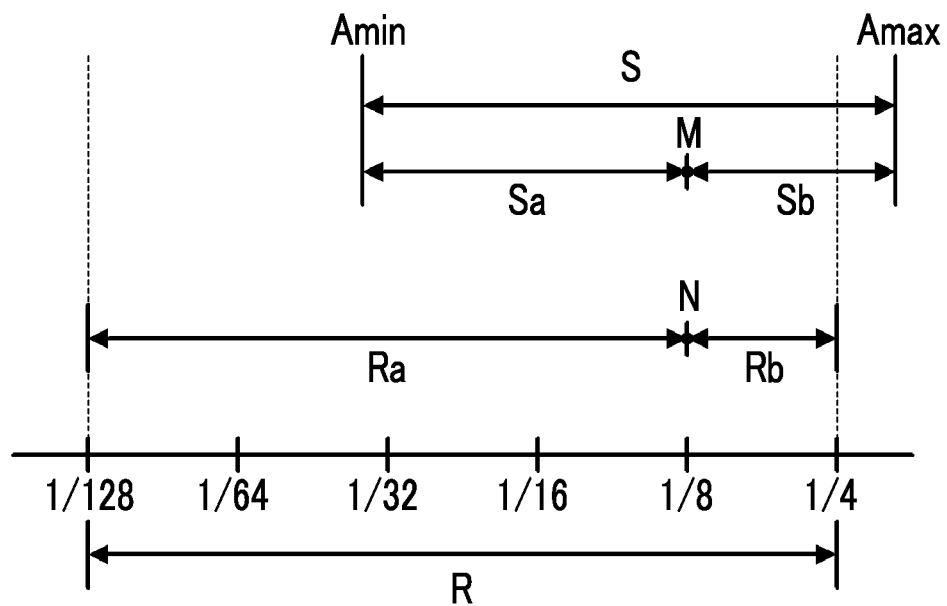
FIG. 5 is a conceptual diagram of determination of a need for correction.

FIGS. 4 and 5 are conceptual diagrams of determination of a need for correction. FIG. 4 shows an example of a case where there is no need for correction. FIG. 5 shows an example of a case where there is a need for correction.

The exposure control amount correction unit 40E determines that there is a need for correction in a case where an estimated exposure fluctuation range S is not included in a settable range R of the variable ND filter 13.

The estimated exposure fluctuation range S is a predicted fluctuation range of an exposure amount in a case where a video is imaged. In regard to the estimated exposure fluctuation range S, an estimated exposure fluctuation range Sa on a darkening side and an estimated exposure fluctuation range Sb on a brightening side are obtained with an exposure amount M in a case where the exposure control amounts are set, as a reference. The exposure amount M in a case where the exposure control amount is set represents current brightness (exposure amount) of the subject.

The estimated exposure fluctuation range S is calculated based on the estimated exposure change amount. For example, in a case where the estimated exposure change amount is Amin to Amax (Amin is a minimum value of the estimated exposure change amount and Amax is a maximum value of the estimated exposure change amount), and a range of Amin to M is the estimated exposure fluctuation range Sa on the darkening side. A range of M to Amax is the estimated exposure fluctuation range Sb on the brightening side. The estimated exposure fluctuation range S is an example of a first exposure condition range.

The settable range R of the variable ND filter 13 is a range where the control range of the variable ND filter 13 can be applied. In regard to the settable range R of the variable ND filter 13, a settable range Ra in a direction (a direction to be brightened) in which the decreasing rate is lowered and a settable range Rb in a direction (a direction to be darkened) in which the decreasing rate is raised are obtained with a current set value N (the currently set decreasing rate of the light amount) as a reference. In a case where the movable range of the variable ND filter 13 is ¼ to ¹⁄₁₂₈, a range of ¼ to N is the settable range Ra in the direction in which the decreasing rate is lowered, and a range of N to ¹⁄₁₂₈ is the settable range Rb in the direction in which the decreasing rate is raised. The settable range R of the variable ND filter 13 is an example of a second exposure condition range.

In a case of the example shown in FIG. 4, the estimated exposure fluctuation range S is included in the settable range R of the variable ND filter 13. In this case, the exposure control during imaging can be performed only with the variable ND filter 13. For this reason, in a case where the estimated exposure fluctuation range S is included in the settable range R of the variable ND filter 13, the exposure control amount correction unit 40E determines that there is no need for the correction of the exposure control amount set in the exposure control amount setting unit 40C.

On the other hand, in a case of the example shown in FIG. 5, the estimated exposure fluctuation range S exceeds the settable range R of the variable ND filter 13. That is, the settable range Rb in the direction in which the decreasing rate is raised is insufficient with respect to the estimated exposure fluctuation range Sb on the brightening side. In this case, it is not possible to follow change in brightness only with the variable ND filter 13. Accordingly, in this case, the exposure control amount correction unit 40E determines that there is a need for the correction of the exposure control amount set in the exposure control amount setting unit 40C.

In a case where determination is made that there is a need for correction of the exposure control amount, the exposure control amount correction unit 40E corrects the exposure control amounts such that the estimated exposure fluctuation range S is included in the settable range R of the variable ND filter 13. That is, the exposure control amounts are corrected such that the estimated exposure fluctuation range Sa on the darkening side falls within the range of the settable range Ra in the direction in which the decreasing rate is lowered, and the estimated exposure fluctuation range Sb on the brightening side falls within the range of the settable range Rb in the direction in which the decreasing rate is raised. The correction is performed by the following procedure, for example.

First, the set value of the variable ND filter 13 is corrected such that the estimated exposure fluctuation range is included in the settable range of the variable ND filter 13. That is, the currently set decreasing rate of the light amount is corrected.

Figure 6:
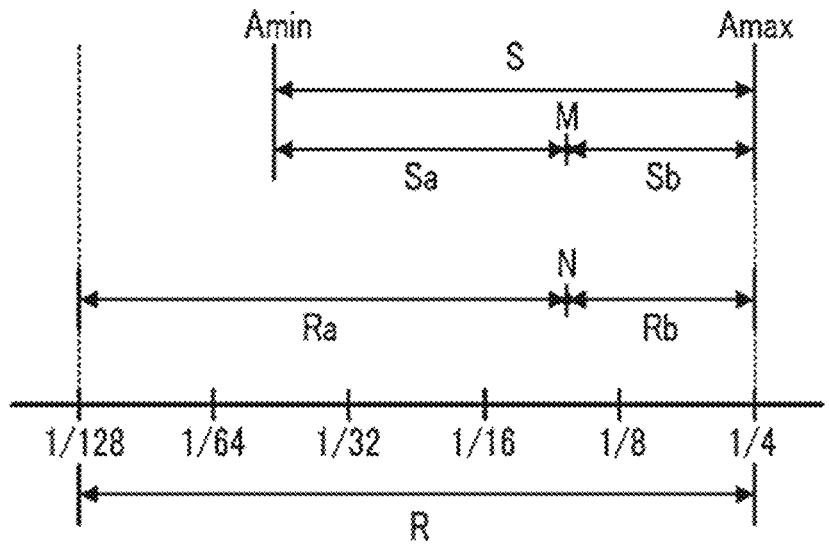
FIG. 6 is a conceptual diagram of correction of setting of a variable ND filter.

FIG. 6 is a conceptual diagram of correction of setting of the variable ND filter. FIG. 6 shows an example of a case where correction is performed from the state of FIG. 5.

In a case of the example shown in FIG. 5, the settable range Rb in the direction in which the decreasing rate is raised is insufficient with respect to the estimated exposure fluctuation range Sb on the brightening side. Accordingly, in this case, the set value of the variable ND filter 13 in the direction in which the decreasing rate is lowered is corrected. In this case, it is preferable that a correction amount is a minimum. With this, in correcting other exposure control amounts, it is possible to reduce the correction amount. That is, it is possible to maintain a state as close to the current exposure condition as possible.

In the example shown in FIG. 6, the set value of the variable ND filter 13 is corrected such that the estimated exposure fluctuation range Sb on the brightening side and the settable range Rb in the direction in which the decreasing rate is raised coincide with each other.

After the set value of the variable ND filter 13 is corrected, other exposure control amounts are corrected. That is, since the set value of the variable ND filter 13 is changed due to the correction, the exposure conditions (the F number, the shutter speed, and the imaging sensitivity) are changed such that the desired brightness is obtained, under the new set value (the decreasing rate of the light amount). In this case, each exposure control amount is corrected following the currently set exposure control mode. That is, in a case where the exposure control mode is set to the aperture priority mode, the exposure control amounts other than the F number are corrected. In a case where the exposure control mode is set to the shutter speed priority mode, the exposure control amounts other than the shutter speed are corrected. In a case where the exposure control mode is set to the manual mode, the exposure control amounts other than the F number and the shutter speed are corrected. In each mode, a case where the desired brightness cannot be set only with the changeable exposure control amounts is also supposed. For example, in a case of the manual mode, a case where the desired brightness cannot be set only by the correction of the imaging sensitivity is also supposed. In such a case, the fixed exposure control amount is also corrected together. In this case, it is preferable that the priority of the correction is determined in advance. The priority may be set by the user.

In a case where the exposure control amounts are corrected in the exposure control amount correction unit 40E, the exposure control amounts after the correction are the exposure control amounts in imaging. In a case where the exposure control amounts are not corrected, the exposure control amounts set in the exposure control amount setting unit 40C are the exposure control amount in imaging.

[Imaging Operation]

In the imaging apparatus 1 of the present embodiment, the exposure during imaging is controlled only with the variable ND filter 13 as much as possible while the exposure conditions (the F number, the shutter speed, and the imaging sensitivity) set by the user are maintained as much as possible. For this reason, in the imaging apparatus 1 of the present embodiment, each exposure control amount in starting imaging is set as follows.

Figure 7:
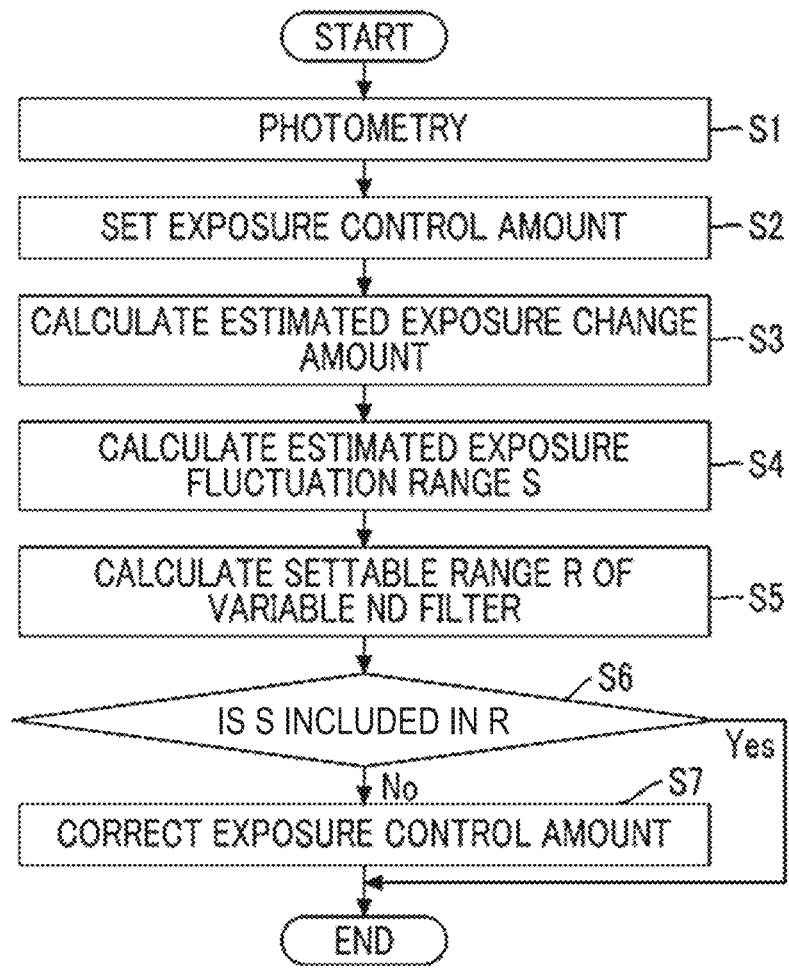
FIG. 7 is a flowchart showing a setting procedure of exposure control amounts in starting imaging.

FIG. 7 is a flowchart illustrating a setting procedure of the exposure control amounts in starting imaging.

First, in a case where an instruction to start imaging is issued, photometry processing is executed (Step S1). The instruction to start imaging is issued by pressing the record button. With the photometry, the exposure amount of each region is obtained.

Next, the exposure control amounts are set based on the photometry result (Step S2). The exposure control amount is a temporary exposure control amount. The exposure control amount is set following the set exposure control mode. Specifically, the exposure control amounts are set as follows.

In a case where the exposure control mode is set to the auto mode, after the variable ND filter 13 is set to the median value of the movable range, the remaining exposure control amounts are set such that the desired brightness is obtained (for example, appropriate exposure is performed). That is, the F number, the shutter speed, and the imaging sensitivity are set.

In a case where the exposure control mode is set to the aperture priority mode, after the F number is fixed, the remaining exposure control amounts are set such that the desired brightness is obtained. That is, the shutter speed, the imaging sensitivity, and the decreasing rate of the light amount are set. The F number is determined based on information from the operation unit 36.

In a case where the exposure control mode is set to the shutter speed priority mode, after the shutter speed is fixed, the remaining exposure control amounts are set such that the desired brightness is obtained. That is, the F number, the imaging sensitivity, and the decreasing rate of the light amount are set. The shutter speed is determined based on information from the operation unit 36.

In a case where the exposure control mode is set to the manual mode, after the F number and the shutter speed are fixed, the remaining exposure control amounts are set such that the desired brightness is obtained. That is, the imaging sensitivity and the decreasing rate of the light amount are set. The F number and the shutter speed are determined based on information from the operation unit 36.

Next, the estimated exposure change amount is calculated based on the photometry result (Step S3). In the present embodiment, the range of the exposure amount that covers from the darkest region to the brightest region in the image is obtained based on the photometry result of each region, such that the estimated exposure change amount is calculated.

Next, the estimated exposure fluctuation range S is calculated based on the estimated exposure change amount (Step S4). In regard to the estimated exposure fluctuation range S, the estimated exposure fluctuation range Sa on the darkening side and the estimated exposure fluctuation range Sb on the brightening side are calculated with the exposure amount M in a case where the exposure control amounts are set, as a reference.

Next, the settable range R of the variable ND filter 13 is calculated based on the movable range of the variable ND filter 13 (Step S5). In regard to the settable range R of the variable ND filter 13, the settable range Ra in the direction in which the decreasing rate is lowered and the settable range Rb in the direction in which the decreasing rate is raised are calculated with the current set value N of the variable ND filter 13 as a reference.

Next, based on the calculation results of the estimated exposure fluctuation range S and the settable range R of the variable ND filter 13, determination is made whether or not the estimated exposure fluctuation range S is included in the settable range R of the variable ND filter 13 (Step S6).

Here, a case where the estimated exposure fluctuation range S is included in the settable range R of the variable ND filter 13 is a case where a predicted fluctuation range of the exposure amount falls within the range of the settable range R of the variable ND filter 13 (see FIG. 4). In this case, the exposure can be controlled only with the variable ND filter 13 during video imaging.

On the other hand, a case where the estimated exposure fluctuation range S is not included in the settable range R of the variable ND filter 13 is a case where the predicted fluctuation range of the exposure amount does not fall within the range of the settable range R of the variable ND filter 13 (see FIG. 5). In this case, the exposure cannot be controlled only with the variable ND filter 13 during video imaging. That is, there is a need to change other exposure control amounts during imaging.

Accordingly, in Step S6, in a case where determination is made that the estimated exposure fluctuation range S is not included in the settable range R of the variable ND filter 13 (in a case where the determination of Step S6 is "No"), the exposure control amounts (temporary exposure control amounts) set in Step S2 are corrected (Step S7). The correction of the exposure control amounts is performed as follows, for example. First, the set value of the variable ND filter 13 is changed such that the estimated exposure fluctuation range is included in the settable range of the variable ND filter 13. That is, the currently set decreasing rate of the light amount is changed. After the set value of the variable ND filter 13 is changed, other exposure control amounts are changed. That is, the F number, the shutter speed, and the imaging sensitivity are changed under the newly set decreasing rate of the light amount such that the desired brightness is obtained. The exposure control amounts after the correction are the exposure control amount in starting imaging. The correction is also performed following the currently set exposure control mode. Accordingly, in a case of the aperture priority mode, the shutter speed and the imaging sensitivity are corrected. In a case of the shutter speed priority mode, the F number and the imaging sensitivity are corrected. In a case of the manual mode, the imaging sensitivity is corrected. In a case where the desired brightness cannot be obtained only with the changeable exposure control amounts, other exposure control amounts are also corrected. For example, in the manual mode, in a case where the desired brightness cannot be obtained only with the imaging sensitivity, the F number and the shutter speed are also corrected. In this case, each exposure control amount is corrected following priority determined in advance.

In Step S6, in a case where determination is made that the estimated exposure fluctuation range S is included in the settable range R of the variable ND filter 13 (in a case where the determination of Step S6 is "Yes"), the correction is not performed, and the set temporary exposure control amounts are the exposure control amounts in starting imaging as it is.

The setting of the exposure control amounts in starting imaging is completed with the series of steps described above. Thereafter, the exposure is controlled under the set exposure control amounts, and imaging is started.

As described above, with the imaging apparatus 1 of the present embodiment, the exposure fluctuation range is estimated, and determination is made in advance whether or not the exposure can be controlled only with the variable ND filter based on the estimation result. In a case where determination is made that the exposure cannot be controlled only with the variable ND filter, the exposure control amounts are corrected and are rest such that the exposure can be controlled only with the variable ND filter. With this, it is possible to control the exposure only with the variable ND filter 13 to image a video while maintaining the exposure conditions set by the user as much as possible. With this, it is possible to continuously image a natural video even though brightness is changed. That is, since it is possible to control the exposure only with the variable ND filter 13 as much as possible, it is possible to continuously image a natural video even though brightness is changed.

[Modification Examples]

In the imaging apparatus 1 of the above-described embodiment, although the variable ND filter 13 is set to the median value of the movable range in a case where the exposure control mode is the auto mode, a configuration may be made in which the variable ND filter 13 is set to a value other than the median value.

In the auto mode, in a case where the variable ND filter 13 is set to the median value of the movable range, the processing of determining the need for the correction of the exposure control amounts is not needed. Accordingly, in a case where the exposure control mode is set to the auto mode, the processing of determining the need for the correction the exposure control amounts that is subsequently executed can be omitted.

In the aperture priority mode, the shutter speed priority mode, and the manual mode, in a case where the imaging sensitivity is set (that is, in a case other than auto), the imaging sensitivity is fixed, and the remaining exposure control amounts are set.

In a case where the estimated exposure fluctuation range cannot be made to fall within the settable range of the variable ND filter 13 even with the correction, it is preferable that the variable ND filter 13 is set to the median value of the movable range. For example, in a case where the estimated exposure change amount exceeds the movable range of the variable ND filter 13, it is preferable that the variable ND filter is set to the median value of the movable range, and other exposure control amounts are set.

Second Embodiment

In the imaging apparatus of the first embodiment described above, the fluctuation range of the exposure amount is estimated in advance, and the exposure control amounts in starting imaging are set such that the exposure can be controlled only with the variable ND filter during imaging. Note that an actual exposure amount does not always fall within the estimated fluctuation range. In an imaging apparatus of the present embodiment, in a case where the estimated exposure fluctuation range is changed during imaging, the exposure control amounts are corrected (changed) such that the changed estimated exposure fluctuation range is included in the settable range of the variable ND filter.

Since the apparatus configuration is the same as that of the imaging apparatus of the first embodiment described above, here, only a method of exposure control during imaging will be described.

Figure 8:
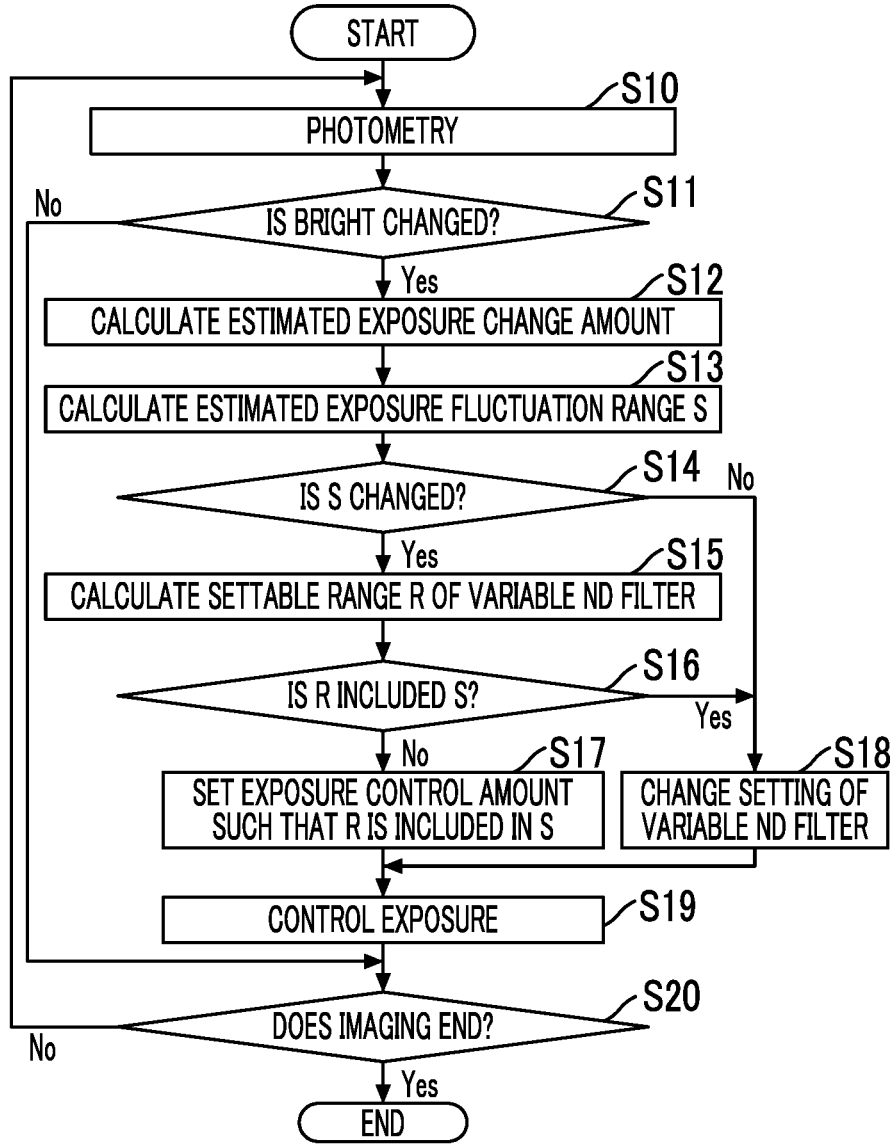
FIG. 8 is a flowchart illustrating a procedure of exposure control during imaging.

FIG. 8 is a flowchart illustrating a procedure of exposure control during imaging.

First, photometry processing is executed (Step S10). Next, determination is made whether or not the brightness (exposure amount) of the subject is changed, based on a photometry result (Step S11).

In a case where determination is made that the brightness of the subject is changed, an estimated exposure change amount is calculated based on the photometry result (Step S12). Next, an estimated exposure fluctuation range S is calculated based on the estimated exposure change amount (Step S13). The estimated exposure fluctuation range S calculated during imaging is an example of a third exposure condition range.

Next, determination is made whether or not the calculated estimated exposure fluctuation range S is changed (Step S14). Specifically, determination is made whether or not the calculated estimated exposure fluctuation range (the third exposure condition range) is different from the estimated exposure fluctuation range (the first exposure condition range) previously calculated.

In a case where determination is made that the estimated exposure fluctuation range S is not changed (in a case where the determination of Step S14 is "No"), the set value of the variable ND filter 13 is changed based on the photometry result such that desired brightness is obtained (Step S18). That is, in this case, since the exposure can be controlled only with the variable ND filter 13, only the set value of the variable ND filter 13 is changed. Subsequently, the variable ND filter 13 is controlled to have the changed decreasing rate, and exposure is controlled (Step S19).

On the other hand, in a case where determination is made that the estimated exposure fluctuation range S is changed (in a case where the determination of Step S14 is "Yes"), determination is made whether or not the estimated exposure fluctuation range S after the change is included in the settable range R of the variable ND filter 13. That is, determination is made whether or not the exposure can be controlled only with the variable ND filter even after the change.

In this case, first, a settable range R is calculated based on the current set value of the variable ND filter 13 (Step S15). Next, determination is made whether or not the estimated exposure fluctuation range S is included in the settable range R, based on the calculated settable range R (Step S16).

In a case where determination is made that the estimated exposure fluctuation range S is included in the settable range R of the variable ND filter 13 (in a case where the determination of Step S16 is "Yes"), the set value of the variable ND filter 13 is changed based on the photometry result such that the desired brightness is obtained (Step S18). That is, even in this case, since the exposure can be controlled only with the variable ND filter 13, only the set value of the variable ND filter 13 is changed. Subsequently, the variable ND filter 13 is controlled to have the changed decreasing rate, and exposure is controlled (Step S19).

On the other hand, in a case where determination is made that the estimated exposure fluctuation range S is not included in the settable range R of the variable ND filter 13 (in a case where the determination of Step S16 is "No"), the exposure control amounts are set such that the estimated exposure fluctuation range S is included in the settable range R of the variable ND filter 13 (Step S17). In this case, first, the decreasing rate of the variable ND filter 13 is set such that the estimated exposure fluctuation range S is included in the settable range R of the variable ND filter 13. Thereafter, other exposure control amounts are set based on the set decreasing rate. That is, the F number, the shutter speed, and the imaging sensitivity are set. In this case, each exposure control amount is set following the setting of the exposure control mode. Subsequently, the exposure is controlled with the set exposure control amounts (Step S19).

After the exposure control, determination is made whether or not an instruction to end imaging is issued (Step S20). In a case where the instruction to end imaging is issued, the processing ends. On the other hand, in a case where the instruction to end imaging is not issued, the process returns to Step S10, and the series of processing described above is repeatedly executed.

As described above, with the imaging apparatus of the present embodiment, the fluctuation range of the exposure amount is estimated even during imaging, and the exposure control amounts other than the variable ND filter are adjusted as needed. That is, only in a case where determination is made that the exposure cannot be controlled only with the variable ND filter, the exposure control amounts other than the variable ND filter are adjusted. With this, it is possible to control the exposure during imaging only with the variable ND filter as much as possible.

Third Embodiment

In a case where the exposure control mode is set to the auto mode, it is preferable that exposure during imaging is controlled as follows.

Figure 9:
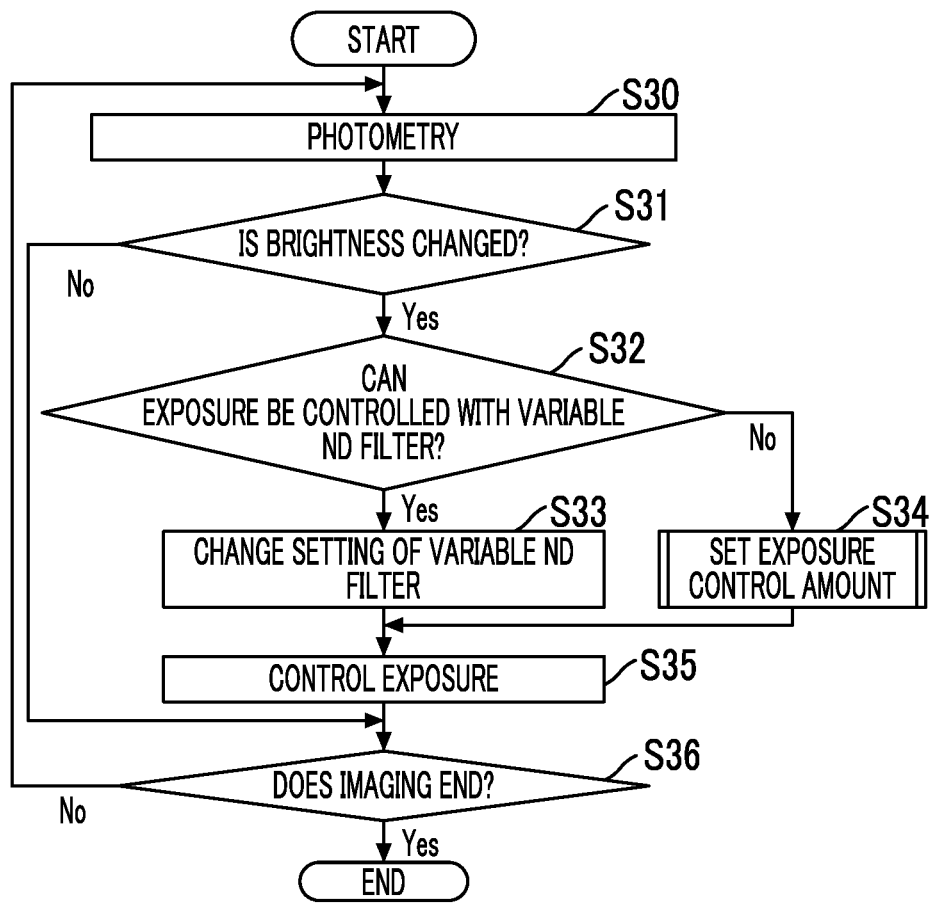
FIG. 9 is a flowchart illustrating a procedure of exposure control during imaging in a case where an exposure control mode is an auto mode.

FIG. 9 is a flowchart illustrating a procedure of exposure control during imaging in a case where the exposure control mode is the auto mode.

Here, it is assumed that the variable ND filter 13 is set to the median value of the movable range, and set imaging is started.

First, photometry processing is executed (Step S30). Next, determination is made whether or not the brightness (exposure amount) of the subject is changed based on a photometry result (Step S31).

In a case where determination is made that the brightness of the subject is changed, determination is made whether or not the exposure can be controlled only with the variable ND filter 13 (Step S32). In this case, determination is made whether or not the changed exposure amount falls within the settable range of the variable ND filter 13. In a case where the changed exposure amount falls within the settable range of the variable ND filter 13, determination is made that the exposure can be controlled only with the variable ND filter 13.

In a case where determination is made that the exposure can be controlled only with the variable ND filter 13 (in a case where the determination of Step S32 is "Yes"), the set value of the variable ND filter 13 is changed (Step S33). That is, the set value (the decreasing rate of the light amount) of the variable ND filter 13 is changed such that desired brightness is obtained. Subsequently, the variable ND filter 13 is controlled to have the changed decreasing rate, and the exposure is controlled (Step S35).

On the other hand, in a case where determination is made that the exposure cannot be controlled only with the variable ND filter 13 (in a case where the determination of Step S32 is "No"), the exposure control amounts are set (Step S34). That is, in this case, since the variable ND filter 13 is out of the settable range, other exposure control amounts are included, and the exposure control amounts are set. The exposure control amounts herein are set as follows, for example.

Figure 10:
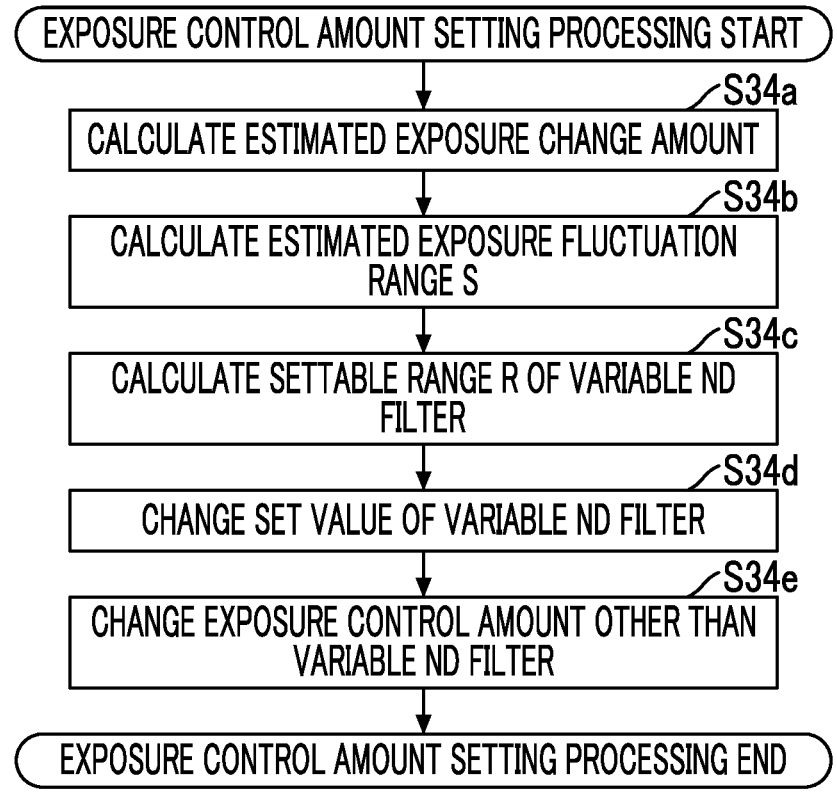
FIG. 10 is a flowchart illustrating a procedure of setting processing of exposure control amounts.

FIG. 10 is a flowchart illustrating a procedure of setting processing of exposure control amounts.

First, the estimated exposure change amount is calculated based on a photometry result (Step S34*a*). Next, the estimated exposure fluctuation range S is calculated based on the calculated estimated exposure change amount (Step S34*b*). Next, the settable range R of the variable ND filter 13 is calculated based on the movable range of the variable ND filter 13 (Step S34*c*). Next, the set value (the decreasing rate of the light amount) of the variable ND filter 13 is changed based on calculation results of the estimated exposure fluctuation range S and the settable range R of the variable ND filter 13 such that the estimated exposure fluctuation range S is included in the settable range R of the variable ND filter 13 (Step S34*d*). In this case, the set value of the variable ND filter 13 is changed under a condition that a change amount is a minimum. With this, it is possible to reduce change amounts of other exposure control amounts. Next, the exposure control amounts other than the variable ND filter are changed under a newly set decreasing rate such that the desired brightness is obtained (Step S34*e*). In this case, the F number, the shutter speed, and the imaging sensitivity are changed with priority determined in advance. It is preferable that the priority is set taking into consideration continuity or the like as a video. That is, it is preferable that the priority is set such that a video to be imaged after the change is not unnatural. As an example, the priority can be set in an order of the shutter speed in a range from a maximum value to ½ of the maximum value, the imaging sensitivity, the shutter speed of ½ of the maximum value, and the F number. In this case, first, the shutter speed in the range from the maximum value to ½ of the maximum value is changed. In a case where the described brightness cannot be obtained only with the change, in addition, the imaging sensitivity is changed. In a case where the desired brightness cannot be obtained even by the change of the imaging sensitivity, in addition, the shutter speed is changed. That is, the shutter speed is changed to the shutter speed of ½ of the maximum value. In a case where the desired brightness cannot be changed even by the change of the shutter speed, in addition, the F number is changed. In this way, the exposure control amounts of the F number, the shutter speed, and the imaging sensitivity are changed following the priority determined in advance, and exposure control amounts with which the desired brightness is obtained are set.

In a case where the exposure control amounts are set, the exposure is controlled with the set exposure control amounts (Step S35). After the exposure control, determination is made whether or not an instruction to end imaging is issued (Step S36). In a case where the instruction to end imaging is issued, the processing ends. On the other hand, in a case where the instruction to end imaging is not issued, the process returns to Step S30, and the series of processing described above is repeatedly executed.

As described above, in a case where the variable ND filter 13 is out of the settable range, the exposure control amounts other than the variable ND filter are changed, and the settable range of the variable ND filter 13 is secured. In this case, the exposure control amounts other than the variable ND filter are changed with the priority determined in advance.

[Modification Examples]

In a case where the variable ND filter is out of the settable range, in setting the exposure control amounts, a configuration may be made in which the variable ND filter is set to the median value of the movable range.

In changing the exposure control amounts other than the variable ND filter, the priority of the exposure control amounts to be changed may be set by the user.

Fourth Embodiment

In an imaging apparatus of the present embodiment, in calculating the estimated exposure fluctuation range, the estimated exposure fluctuation range is calculated with a margin. Specifically, a predetermined margin (fluctuation width) is added to an estimated exposure change amount obtained from a photometry result to calculate the estimated exposure fluctuation range.

The imaging apparatus of the present embodiment is the same as the imaging apparatus of each of the first to third embodiments except that a calculation method of the estimated exposure fluctuation range is different. Accordingly, here, only the calculation method of the estimated exposure fluctuation range will be described.

Figure 11:
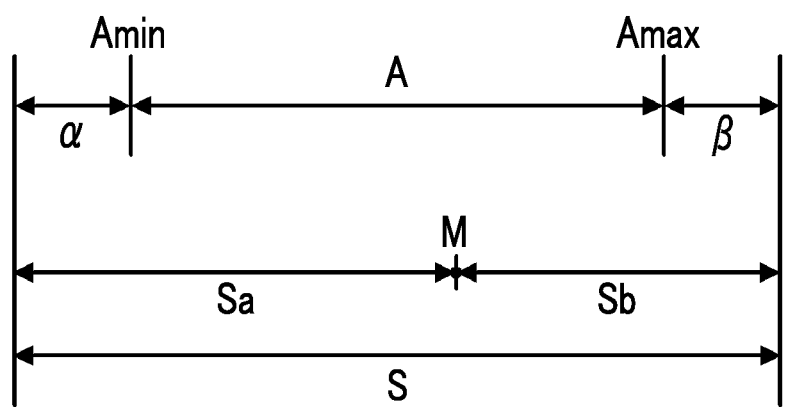
FIG. 11 is a conceptual diagram of calculation of an estimated exposure fluctuation range.

FIG. 11 is a conceptual diagram of calculation of the estimated exposure fluctuation range.

As described above, the estimated exposure fluctuation range S is calculated by predetermined margins α and β to an estimated exposure change amount A (Amin to Amax) obtained from the photometry result. In regard to the margins α and β, the margin α that is added to the darkening side (−side) and the margin β that is added to the brightening side (+side) are separately prepared. The margins α and β to be added are decided based on the estimated exposure change amount.

FIG. 12 is a diagram showing an example of a margin that is added to the estimated exposure change amount.

According to the example shown in FIG. 12, for example, in a case where the estimated exposure change amount A is β 13 to 15 (Amin=13, Amax=15), the margin α on the darkening side is 2, and the margin β on the brightening side is 1. Accordingly, in this case, the estimated exposure fluctuation range S is set to a range of 11 to 16. For example, in a case where the estimated exposure change amount A is 0 to 2 (Amin=0, Amax=2), the margin α on the darkening side is 2, and the margin β on the brightening side is 3. Accordingly, in this case, the estimated exposure fluctuation range S is set to a range of 2 to 5. In a case where the estimated exposure change amount A strides over ranges determined in a table of FIG. 12, a margin that is set larger is given with priority. For example, in a case where the estimated exposure change amount A is 6 to 7, while the margin α on the darkening side can take a value of 3 to 4, and the margin β on the brightening side can take a value of 3 to 4, a value that is set larger is given with priority. Accordingly, in this case, the margin α on the darkening side is 4, and the margin β on the brightening side is 4. In a case where the estimated exposure fluctuation range after the margin is added exceeds an upper limit or a lower limit of the exposure amount, the estimated exposure fluctuation range is set to the upper limit or the lower limit. For example, in the example of FIG. 12, in a case where the estimated exposure fluctuation range exceeds 16 EV or −4 EV, the estimated exposure fluctuation range is set to 16 EV or −4 EV.

In this way, the predetermined margins are added to the estimated exposure change amount obtained from the measurement result to calculate the estimated exposure fluctuation range, whereby it is possible to more appropriately set the estimated exposure fluctuation range. That is, it is possible to more appropriately set the predicted fluctuation range of the exposure amount in a case where a video is imaged.

[Modification Examples]

In the above-described embodiment, although the margins α and β are set based on the estimated exposure change amount A, a setting method of the margins α and β to be added is not limited thereto. Hereinafter, another example of a setting method of margins will be described.

(1) Setting Method 1 of Margins

A margin is set depending on a scene to be imaged. In this case, the margins α and β that should be added are determined for each scene in advance. In a case of imaging, a scene is specified, and information regarding the margins α and β that should be added is acquired.

As a method of specifying a scene, a method in which the user selects a scene, a method in which the imaging apparatus automatically recognizes a scene, or the like can be employed. As the method of automatically recognizing a scene, for example, a method using a photometry result can be employed. For example, a method of determining a scene from information regarding the exposure amount obtained by photometry can be employed. FIG. 13 is a diagram showing an example of a relationship between an exposure amount and a scene. As shown in FIG. 13, some scenes (imaging scene information) can be specified from the exposure amount. According to the example shown in FIG. 13, for example, in a case where a range of an exposure amount of each divided region is 13 EV to 15 EV, determination can be made that an imaging scene is fine weather. Accordingly, in this case, the margins α and β prepared for the imaging scene of fine weather are added to the estimated exposure change amount, and the estimated exposure fluctuation range is set. As a specification method of specifying an imaging scene, other known techniques can be employed.

In a case where the user specifies a scene, for example, a method in which selectable imaging scenes are displayed on the display unit 34 in a list, and the user selects an imaging scene using the operation unit 36 can be employed.

(2) Setting Method 2 of Margins

Optimum margins are set using a history of past imaging of the user. That is, optimum margins α and β are set from a past imaging tendency of the user. In this case, for every imaging of a video, the fluctuation width of the exposure amount is measured, and information regarding the measured fluctuation width is recorded. In regard to the fluctuation width, both a fluctuation width in a darkening direction and a fluctuation width in a brightening direction are measured and recorded. In calculating the estimated exposure fluctuation range, the margin α on the darkening side and the margin β of the brightening side are set based on the recorded fluctuation widths. For example, an average value of the recorded fluctuation widths is set as a margin. Alternatively, a maximum value of the recorded fluctuation widths is set as a margin. The present processing is executed by the system control unit 40. Information regarding the fluctuation widths is recorded in, for example, the auxiliary storage unit 32 configured with an internal memory.

(3) Setting Method 3 of Margins

Margins are set manually. In a case where a fluctuation width of an exposure amount that is supposed in a case where a video is imaged is known in advance, the margins α and β can be set using information regarding the fluctuation width of the exposure amount. For example, in a case where a place (scene) where imaging is performed is decided, or the like, the supposed fluctuation width of the exposure amount is known to some extent in advance. For example, in a case of imaging outdoors only, since sudden darkening does not occur, it is supposed that the fluctuation width is small. On the other hand, in a case of imaging at a live place, a wedding hall, or the like, since a scene where brightness is suddenly changed is supposed, it is supposed that the fluctuation width is large.

In a case of the present example, for example, a setting screen of margins is displayed on the display unit 34, and the margins α and β are set manually using the operation unit 36.

(4) Setting Method 4 of Margins

A fluctuation width of an exposure amount is measured to set optimum margins. For example, in a case where an area (place) where imaging is performed is decided in advance, or the like, a fluctuation width of an exposure amount of the area where imaging is performed is measured, and margins are set using a measurement result.

Other Embodiments (1) Transmittance Control Element

In the above-described embodiments, although a case where the electronic variable ND filter is used as the transmittance control element has been described as an example, an optical element that can be used as the transmittance control element is not limited thereto. Any optical element may be used as long as transmittance can be changed. For example, as the transmittance control element, other light control element, such as a liquid crystal optical element, can also be used.

(2) Imaging Apparatus

The imaging apparatus is limited as being configured alone, and include that incorporated in other equipment. For example, a camera that is incorporated in a smartphone, a personal computer, a wearable device, or the like is also included in the imaging apparatus.

(3) Processor

As a processor for carrying out the processing of the present invention, a central processing unit (CPU) that is a general-purpose processor, a programmable logic device (PLD) that is a processor capable of changing a circuit configuration after manufacture, such as a field programmable gate array (FPGA), a dedicated electric circuit that is a processor having a circuit configuration dedicatedly designed for a specific processing, such as an application specific integrated circuit (ASIC), or the like are included.

One control unit and signal processing unit may be configured with one of various processors described above or may be configured with two or more processors (for example, a plurality of FPGAs or a combination of a CPU and an FPGA) of the same type or of different types.

A plurality of control units and signal processing units may be configured with one processor. As an example where a plurality of control units and signal processing units are configured with one processor, first, there is a form in which one processor is configured with a combination of one or more CPUs and software and the processor functions as a plurality of control units and signal processing units. Second, as represented by System On Chip (SoC) or the like, there is a form in which a processor that realizes all functions of a system including a plurality of control units and signal processing units with one integrated circuit (IC) chip is used.

In this way, various control units and signal processing units are configured using one or more of various processors described above as the hardware structure.

In addition, the hardware structure of various processors described above is, more specifically, an electric circuit in which circuit elements, such as semiconductor elements, are combined.

EXPLANATION OF REFERENCES

1: imaging apparatus
10: imaging lens
11: lens
12: stop
13: variable ND filter
14: lens drive unit
15: stop drive unit
16: ND filter drive unit
20: imaging element
20A: light-receiving surface of imaging element
22: imaging element drive unit
24: analog signal processing unit
26: ADC
28: main storage unit
30: digital signal processing unit
32: auxiliary storage unit
34: display unit
36: operation unit
40: system control unit
40A: exposure control mode determination unit
40B: photometry unit
40C: exposure control amount setting unit
40D: exposure change amount estimation unit
40E: exposure control amount correction unit
A: estimated exposure change amount
Amin: minimum value of estimated exposure change amount
Amax: maximum value of estimated exposure change amount
M: exposure amount as exposure control amount is set
N: set value of variable ND filter
R: settable range of variable ND filter
Ra: settable range in direction in which decreasing rate of light amount is lowered
Rb: settable range in direction in which decreasing rate of light amount is raised
S: estimated exposure fluctuation range
Sa: estimated exposure fluctuation range on darkening side
Sb: estimated exposure fluctuation range on brightening side
a11 to a88: divided regions
α: margin
β: margin
S1 to S7: setting procedure of exposure control amount in starting imaging
S10 to S20: procedure of exposure control during imaging
S30 to S36: procedure of exposure control during imaging in case where exposure control mode is auto mode
S34a to S34e: procedure of setting processing of exposure control amount

What is claimed is:

1. An imaging apparatus in which an exposure condition is set based on an electronic characteristic of a transmittance control element, the imaging apparatus comprising:
a processor,
wherein the processor is configured to
calculate a first exposure condition range based on photometry of the imaging apparatus,
in a case where the first exposure condition range is not included in a second exposure condition range where a control range acquired by the electronic transmittance control element is applicable, change the exposure condition of the imaging apparatus such that the calculated first exposure condition range is included in the second exposure condition range, and
drive a value of a movable range of the electronic transmittance control element.

2. The imaging apparatus according to claim 1,
wherein the processor is configured to decide imaging scene information based on the photometry of the imaging apparatus and calculate the first exposure condition range based on the decided imaging scene information.

3. The imaging apparatus according to claim 1,
wherein the processor is configured to control exposure with the electronic transmittance control element in the second exposure condition range during imaging.

4. The imaging apparatus according to claim 3,
wherein the processor is configured to, in a case where a third exposure condition range calculated based on the photometry of the imaging apparatus is different from the first exposure condition range during imaging, change the exposure condition of the imaging apparatus such that the third exposure condition range is included in the second exposure condition range.

5. The imaging apparatus according to claim 1,
wherein the exposure condition is an aperture stop control amount, a shutter speed control amount, and a sensitivity control amount.

6. The imaging apparatus according to claim 5,
wherein the processor is configured to
determine an exposure control mode, and
fix the aperture stop control amount to set the exposure condition in a case where the exposure control mode is an aperture priority mode.

7. The imaging apparatus according to claim 5,
wherein the processor is configured to
determine an exposure control mode, and
fix the shutter speed control amount to set the exposure condition in a case where the exposure control mode is a shutter speed priority mode.

8. The imaging apparatus according to claim 5,
wherein the processor is configured to
determine an exposure control mode, and
fix the aperture stop control amount and the shutter speed control amount to set the exposure condition in a case where the exposure control mode is a manual mode.

9. The imaging apparatus according to claim 5,
wherein the processor is configured to
determine an exposure control mode, and
set the electronic transmittance control element to a median value of the movable range in a case where the exposure control mode is an auto mode.

10. The imaging apparatus according to claim 9,
wherein the processor is configured to change the aperture stop control amount, the shutter speed control amount, and the sensitivity control amount with priority determined in advance in a case where the electronic transmittance control element is out of a settable range during imaging.

11. The imaging apparatus according to claim 10,
wherein the priority is an order of the shutter speed control amount in a range from a maximum value to ½ of the maximum value, the sensitivity control amount, the shutter speed control amount of ½ of a maximum value, and the aperture stop control amount.

12. The imaging apparatus according to claim 1, wherein the processor is configured to measure a fluctuation width of an exposure amount in a case where a video is imaged, record information regarding the measured fluctuation width of the exposure amount in a memory, and set the first exposure condition range based on information regarding a history of the fluctuation width of the exposure amount recorded in the memory.

13. The imaging apparatus according to claim 1, wherein the processor is configured to acquire information regarding a fluctuation width of an exposure amount that is supposed in a case where a video is imaged, in advance, and set the first exposure condition range based on the acquired information regarding the fluctuation width of the exposure amount.

14. The imaging apparatus according to claim 1, wherein the processor is configured to acquire information regarding a fluctuation width of an exposure amount of a region where a video is imaged, in advance, and set the first exposure condition range based on the acquired information regarding the fluctuation width of the exposure amount.

\* \* \* \* \*